United States Patent [19]

Kaufman

[11] Patent Number: 4,796,186
[45] Date of Patent: Jan. 3, 1989

[54] CONDUCTIVITY DETERMINATION IN A FORMATION HAVING A CASED WELL

[75] Inventor: Alexander A. Kaufman, Lakewood, Colo.

[73] Assignee: Oil Logging Research, Inc., Denver, Colo.

[21] Appl. No.: 891,951

[22] Filed: Jul. 30, 1986

Related U.S. Application Data

[63] Continuation-in-part of Ser. No. 740,734, Jun. 3, 1985, abandoned.

[51] Int. Cl.$^4$ .......................... G01R 27/02; G01V 3/20
[52] U.S. Cl. ..................................... 364/422; 324/368; 73/151.5
[58] Field of Search .................. 364/420, 421, 422; 324/366, 368, 367, 333; 73/151.5, 152, 155

[56] References Cited

U.S. PATENT DOCUMENTS

| | | | |
|---|---|---|---|
| 1,819,923 | 8/1931 | Schlumberger | 324/366 |
| 1,826,961 | 10/1931 | Slichter | 324/361 |
| 1,845,379 | 2/1932 | West | 324/368 |
| 1,863,542 | 6/1932 | Nichols et al. | 324/357 |
| 1,894,328 | 1/1973 | Schlumberger | 324/366 |
| 2,086,737 | 7/1937 | Pearson | 337/215 |
| 2,103,636 | 12/1937 | Pearson | 324/157 |
| 2,133,786 | 10/1938 | Neufeld | 324/366 |
| 2,140,798 | 12/1938 | Jakosky | 324/355 |
| 2,397,254 | 3/1946 | Ennis | 324/368 |
| 2,400,593 | 5/1946 | Neufeld | 340/979 |
| 2,414,194 | 1/1947 | Ennis | 324/368 |
| 2,459,196 | 1/1949 | Stewart | 324/368 |
| 2,587,518 | 2/1952 | Pearson | 324/368 |
| 2,592,125 | 4/1952 | Doll | 324/351 |
| 2,742,605 | 4/1956 | McMillan, Jr. | 324/366 |
| 2,920,266 | 1/1960 | Owen | 324/366 |
| 3,057,409 | 10/1962 | Grossdman, Jr. | 166/242 |
| 3,256,480 | 6/1966 | Runge et al. | 324/366 |
| 3,697,864 | 10/1972 | Runge | 324/368 |
| 3,778,701 | 12/1973 | Runge | 324/10 |
| 3,838,335 | 9/1974 | Miller | 324/10 |
| 4,087,741 | 5/1978 | Mufti | 324/10 |
| 4,415,857 | 11/1983 | Cordell | 324/357 |
| 4,431,963 | 2/1984 | Walkow | 324/65 R |
| 4,431,964 | 2/1984 | Walkow | 324/65 R |
| 4,570,123 | 2/1986 | Grosso | 324/369 |

FOREIGN PATENT DOCUMENTS 56026  11/1939  U.S.S.R. .

OTHER PUBLICATIONS

Douglas W. Hilchie, *Applied Openhole Log Interpretation*, pp. 11-1 to 11-4.

Primary Examiner—Jerry Smith
Assistant Examiner—Kim Thanh Tbui
Attorney, Agent, or Firm—Sheridan, Ross & McIntosh

[57] ABSTRACT

Methods and apparatuses for determining conductivity of a subterranean formation traversed by a well, particularly a cased well are provided. Variations in casing conductivity and/or electrode placement, arising from, e.g. thermal stress or expansion or corrosion, are compensated for. Compensation involves obtaining voltages developed in response to current flowing between relatively closely spaced current electrodes, and using these voltages to provide compensation for voltages developed in response to current flowing between more remotely positioned current electrodes. Modifications are described to permit conductivity measurements in partially cased or uncased wells, or wells being actively drilled.

50 Claims, 5 Drawing Sheets

CONDUCTIVITY DETERMINATION IN A FORMATION HAVING A CASED WELL

This application is a continuation-in-part of application Ser. No. 740,734 filed June 3, 1985, now abandoned.

FIELD OF THE INVENTION

The present invention relates to well logging and, in particular, to a method for determining conductivity of a subterranean formation traversed by a well, especially a well having a casing.

BACKGROUND INFORMATION

The conductivity of subterranean formations or strata which surround a well (borehole) varies depending on such factors as the porosity of the formation and the amount and character of any fluids which might permeate or be trapped in the formation. The magnitude of the formation conductivity is used to deduce certain characteristics of the strate penetrated by the well and to assist in predicting the likely performance in yield of the well. This information is useful with respect to a wide variety of wells, including oil and gas wells, geothermal wells, groundwater wells, mining wells and others. Some useful information is provided by a knowledge of the relative differences in conductivity, i.e., a knowledge that a given stratum is more or less conductive than another stratum or knowledge regarding the ratio of the conductivities of two layers or formations. The most useful information, however, is the absolute, rather than relative, value of conductivity of a formation, expressible in units such as mhos per meter.

Because of the usefulness of this information, several methods have been devised in an attempt to obtain absolute values of conductivity (resistivity), many employing measurements of electrical parameters made in the well itself. These methods have had some success in providing conductivity information in uncased wells or in uncased portions of partially cased wells. However, these methods cannot be used to find absolute values of conductivity of strata surrounding cased portions of wells, because such methods were designed to function properly and accurately only in uncased wells and such methods do not work in cased wells.

Methods for determining formation conductivity in the vicinity of cased wells would be useful in a number of commonly-encountered situations including exploration of old oil fields, mapping injection profiles in the secondary recovery of oil and gas, and special conditions of formations when it is necessary to use full or partial casing directly after drilling.

Although a number of attempts have been made to apply electric logging techniques to cased wells, only nuclear and acoustic methods are in widespread use in cased wells. Proposals for electrical methods for use in cased wells include U.S. Pat. No. 2,459,196 to Stewart entitled "Electrical Logging Method and Apparatus", and U.S.S.R. Pat. No. 56,026 to Alpin entitled "Method of the Electrical Logging in Wells with Casing".

The Stewart reference discloses a method for deducing relative change of resistivities of strata penetrated by a cased borehole by measuring current flowing along various intervals of the casing using current electrodes for supplying current to the casing, and which are electrically connected to a current source, and receiver electrodes which are positioned along the path of current through the casing. In principle, from these measurements one can obtain information about the formation conductivity. However, the approach described in this patent does not allow one to solve this problem practically for the following reasons: (a) the method does not recognize that there is a range of optimal relative distances between the current electrodes and the receiver electrodes and between the receiver electrodes or that variations in casing thickness or conductivity and deviation of the distance between receiver electrodes from the ideal distance produce significant effects on the measured quantities; (b) the magnitude of current within every interval of the casing is measured separately; correspondingly, every measurement is performed with different accuracy due to several factors such as a change in amplifier gain, a change of grounding resistance with the casing, and the instability of the current source; and (c) inasmuch as the leakage of current into the formation is very small with respect to a measured current, it is virtually impossible in such a way to evaluate this leakage with proper accuracy, derived as a difference of measured currents particularly when the formation thickness is relatively small. The effect of each of these considerations is that the value of current "leakage" (i.e. that current which leaks through the casing and into the formation, rather than traveling along the casing), is comparable to or less than the magnitude of "noise" signals.

The Alpin reference discloses connecting a current source directly to the casing at one position and measuring the voltage drop across probes directly contacting the casing at other positions. The Alpin method uses two current electrodes for supplying current to the casing and which are electrically connected to the current source. Alpin also provides receiver electrodes for use in receiving or measuring the magnitude of electrical parameters in the borehole. One current electrode is positioned relatively close to the receiver electrodes and the other current electrode is positioned relatively far removed from the receiver electrodes. By repeating the voltage measurement at a number of levels, Alpin obtains a curve which is intended to be applied for the same purposes as the usual curve of apparent resistivity. The approach described by Alpin is impractical for providing useful information about formation conductivity because: (a) this approach does not recognize that variations in casing thickness and conductivity and deviation of the distance between receiver electrodes from the ideal distance produces significant effects on measured quantities; (b) only relative conductivities are theoretically obtainable; and (c) Alpin does not recognize that a minimum distance is required between the current source electrodes and receiver electrodes to eliminate the influence of distortions of the electrical field on the voltage measurements.

The method and apparatus disclosed in copending parent application Ser. No. 740,734 has certain similarities to the method and apparatus described herein, however, the method of the parent application does not recognize that variations in casing thickness and casing conductivity and deviation of the distance between receiver electrodes from the ideal distance produces significant effects on measured quantities, and therefore does not disclose a method for overcoming or compensating for these effects.

In general, previous methods for electrical logging in cased wells can in principle produce data but such data suffers from the characteristic that the signal to noise ratio is so low that useful information regarding the surrounding formations cannot be reliably obtained. An understanding of the methods which result in data with improved signal to noise ratio requires some discussion of the characteristics of an electrical field residing in a cased borehole and the surrounding formation.

Understanding of the electrical field configuration is assisted by considering a cased well at least several hundred meters long having a current electrode situated approximately on the longitudinal axis of the well and located several hundred feet below the surface. When current is supplied to the current electrode, current close to the location of the current electrode, i.e., within a distance less than a few times the radius of the borehole, flows radially, i.e., symmetrically in all directions. At distances from the current electrode of about ten to twenty times greater than the radius of the borehole, the current is practically oriented parallel to the axis of the borehole. Although some of the current still flows through the borehole medium, the significant majority of the current is conducted by the well casing at this distance from the current electrode. The electric field along the borehole axis can be approximately defined by the following equation:

$$E_z(L) = 0.5 \frac{I}{S_c} - 1.85 \frac{I}{S_o} e^{-2.41(L/a)} - \frac{0.48(\sigma_f)^{\frac{1}{2}} IL}{S_c^{\frac{3}{2}}} \quad (1)$$

where:

$E_z(L)$ is the electric field at a distance L from the current electrode;
I is the current at the current electrode;
$S_c$ is the casing conductance;
$S_o$ is the borehole conductance;
a is the borehole radius; and
$\sigma_f$ is the formation conductivity.

The relative magnitude of the three terms of this relation depends heavily on the value of (L/a). In the region relatively close to the current electrodes, when the value of (L/a) is less than about ten, the electric field is mainly defined by the second term of Equation (1). At greater distances from the current electrodes, when (L/a) is greater than about ten, but while the current flow is essentially parallel to the borehole axis, the field is dominated by the first and last terms of Equation (1).

If receiving electrodes for measuring voltage are inserted into the borehole and positioned at points in the "intermediate" range (i.e., in the area where current flow is substantially parallel to the borehole axis) based on a number of theoretical considerations, the voltage between receiver electrodes M and N will be given with a high accuracy by Equation (2).

$$V_{MN} = \frac{I \cdot MN}{S_{MN}} \left( 1 - \frac{a}{2} L_{MN}^\circ \right) \quad (2)$$

where:

$V_{MN}$ is the voltage measured between receiver electrodes M and N, where N is situated above M;
MN is the distance between electrodes M and N;
$S_{MN}$ is the casing conductance between M and N;
$\alpha = (\pi \cdot S_{MN})^{-\frac{1}{2}}$;
$\rho$ is the formation resistivity; and
$L_{MN}$ is the distance from the current electrode to the midpoint of the interval MN.

If a third voltage measuring or receiver electrode $M_1$ is positioned above electrode N, which in turn is in a position above electrode M, Equation (2) can be used to derive an expression for the formation resistivity:

$$(\rho)^{\frac{1}{2}} = \frac{I \cdot (MN)^2}{S^{3/2} \Delta V_{1e}} \quad (3)$$

where:

$$\Delta V_{1e} = V_{MN} - V_{NM_1}$$

$$= \frac{I \cdot MN}{S_{MN}} \left( 1 - \frac{a}{2} L_{MN}^\circ \right) -$$

$$\frac{I \cdot NM_1}{S_{NM_1}} \left( 1 - \frac{a}{2} L_{MN_1}^\circ \right)$$

It has been found that Equation (3) establishes a relation between resistivity of a medium and the value of $\Delta V_{1e}$, provided that the following assumptions are made: (1) the distance between electrodes M and N is equal to the distance between electrodes N and $M_1$; (2) the casing resistivity between electrodes M and N is equal to the casing resistivity between electrodes N and $M_1$; and (3) the voltage measurements are made in the borehole where the current flow is substantially parallel to the borehole axis.

As follows from the theory of the method, if the above three assumptions are met, then the ratio of the formation resistivity laterally adjacent to a first voltage measurement location to the formation resistivity laterally adjacent to a second voltage measurement location can be expressed as:

$$\frac{\rho_2}{\rho_1} = \frac{\Delta V_{1e}^{(1)}}{\Delta V_{1e}^{(2)}} \quad (4)$$

where $\rho_2$ is the resistivity of the formation laterally adjacent to location 2;
$\rho_1$ is the resistivity of the formation laterally adjacent to location 1;
$\Delta V_{1e}^{(1)} = V_{MN} - V_{NM_1}$ when electrodes M, N and $M_1$ are in a first fixed relationship relative to each other (position 1); and
$\Delta V_{1e}^{(2)} = V_{MN} - V_{NM_1}$ when electrodes M, N and $M_1$ are in a second fixed relationship relative to each other (position 2).

Whether it is justified to simplify Equation (3) so as to be able to express the ratio of formation conductivities in terms of measurable voltages, as in Equation (4), depends on the validity of the three assumptions above. It is possible to estimate the magnitude of the effect which violations of assumptions (1) and (2) would have on measured voltages. Variations in the distance between the electrodes can be caused by such factors as thermal expansion or contraction and high pressures developed in the borehole. Differences in the casing conductivity can be caused by such factors as a change in the casing thickness or a change in the resitivity of the casing material or the presence of fractures, any of which can be caused by manufacturing variances or corrosion taking place in the borehole. When the magnitude of the effect of such variations on voltage measurements is compared to the magnitude of the voltage signal which it is desired to measure, it is found that voltages which arise from violation of the above assumptions are of the same magnitude as the voltage which it is desired to measure. In other words, in ordinary borehole conditions, violation of assumptions (1) and (2) produces "noise" which is substantially equal in magnitude to the signal which is being measured. Thus, one of the difficulties to be solved in order to provide reliable indications of formation resistivity is compensation for variation in electrode spacing and/or casing conductivity.

SUMMARY OF THE INVENTION

The present invention solves the problem of compensating for variation in the spacing of receiver electrodes and/or casing conductivity by conducting two steps to obtain a single value relating to formation conductivity. The first step involves taking a measurement which relates to the conductance of the casing. The casing conductance is influenced by both the casing conductivity and the receiver electrode placement or spacing. The second step involves using the first measurement to compensate a measurable voltage difference between two pairs of receiver electrodes for variations in the casing conductivity and the receiver electrode spacing so as to obtain a value which relates to the formation conductivity. This compensation can be by means of calculation, or can be accomplished electronically.

By casing conductance is meant the inverse of the resistance of the casing. As noted above, it has been found that, for purposes of obtaining values related to formation conductivity, variations in casing conductance are substantially caused by two factors: variation in casing conductivity and variations in electrode location. Conductivity, the reciprocal of resistivity, is expressed as conductance per unit length, such as mhos/cm.

The first step, i.e. taking a measurement relating to the casing conductance, can be conducted by measuring the voltage across receiver electrodes within the borehole while current is flowing between spatially positioned current electrodes within the well. The current electrodes used for the casing conductance measurements are positioned so that the difference between the voltage across pairs of receiver electrodes substantially represents the influence of the casing conductance. The current electrodes result in this effect at the receiver electrodes when each of the current electrodes is positioned in the proximity of the receiver electrodes. In such a configuration of electrodes, a measurement of voltage across two intervals within the borehole, such as that which can be obtained by three spaced receiver electrodes, can be used to obtain a value relating to the difference of casing conductivity and receiver electrode spacing between the two casing intervals.

The second step, which involves obtaining a value relating to the voltages over a distance in the well, can be conducted using the same configuration of electrodes as described with respect to values related to the casing conductance, except that at least one current electrode which was proximate to receiver electrodes is instead positioned remotely from the receiver electrodes. In this configuration, the uncompensated difference in voltages across the two intervals between the receiver electrodes reflects both the effect of current leakage into the formation and the effect of differences in casing conductance, i.e. differences in casing conductivity and electrode placement.

Having obtained a value relating to casing conductance by one measurement configuraton, this value can be used to compensate the value which relates to voltages so as to "factor out" that portion which is attributable only to casing conductance differences, leaving a value which relates only to current leakage and thus indicating the resistivity of the adjacent underground formation. This factoring out can be accomplished by calculation, either manual or computer-assisted, or can be accomplished electronically. As a result of this factoring out, it is possible to obtain a value which relates to the resistivity of the adjacent underground formation. It is apparent that this value is obtained without the necessity of detecting the magnitude of current along the casing and without requiring discrimination of a small amplitude signal imposed on a large base or carrier value.

An understanding of the electrical field within the borehole has made it possible to use the values thus obtained not only to provide relative indications of formation conductivity, i.e., indications of the ratio of the resistivity of two formations, but also to provide the absolute resistivity, i.e. the resistivity expressable in standard units such as ohms per meter.

In addition to providing resistivity of formations adjacent to a cased well, this invention is useful, with the modificiations described below, for obtaining resistivity of formations adjacent to partially cased wells, uncased wells, and wells which are actively being drilled.

The invention is also useful for evaluating the condition of well casing by obtaining conductivities of different portions of the casing.

BRIEF DESCRIPTIONS OF THE DRAWINGS

DETAILED DESCRIPTION OF THE EMBODIMENTS OF THE INVENTION

Figure 1:
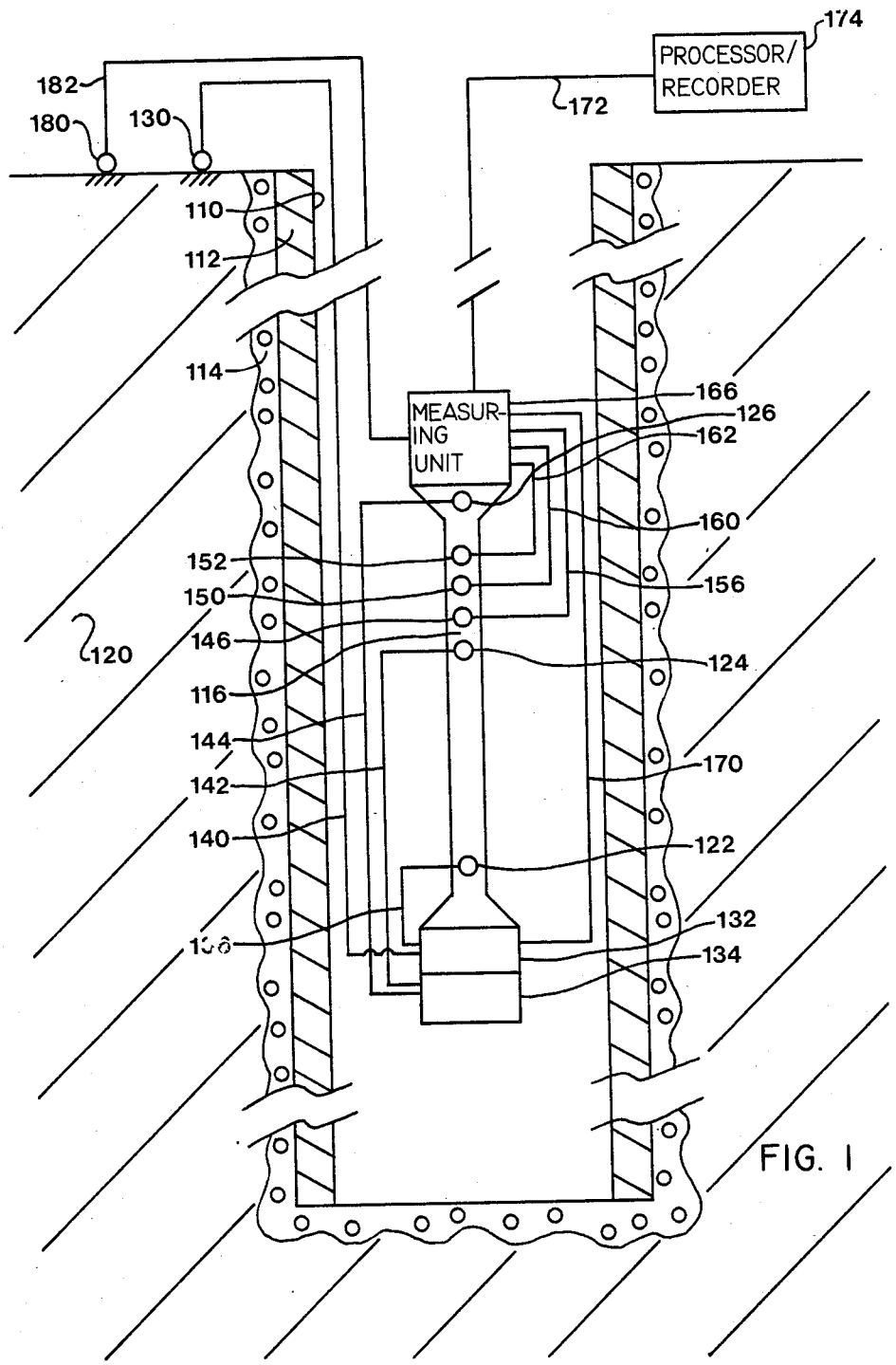
FIG. 1 is a diagramatic view of a cased well containing a probe with current electrodes and three receiver electrodes for measuring electrical parameters useful in the practice of the present invention.

In accordance with the present invention, methods and apparatuses are provided for measuring conductivity of a sub-terranean formation adjacent to a well. Referring now to the drawings, FIG. 1 shows a well, 110 in cross section which is lined with a conductive casing 112. Note that FIG. 1 is schematic in nature and is not intended to be in proportion. In at least some wells, the casing might be held in place by a layer of cement 114 usually on the order of 5 to 10 cm thick and typically not exceeding 20 cm in thickness. The well may be filled with a fluid such as drilling mud, brine, water, or other fluids.

A probe 116 is positioned in the well and is located adjacent to a portion of a formation 120 whose conductivity or, relatedly, resistivity, is to be found. The probe 116 comprises a substantially non-conducting body, such as plastic or other such material, that is generally cylindrical in shape. First, second and third current electrodes 122, 124, 126 are positioned on the probe 116. A fourth current electrode 130 is positioned far away from the receiver electrode and, in the embodiment depicted in FIG. 1, outside the well in electrical contact with the earth. The current electrodes 122, 124, 126, 130 are made of a conducting material such as copper or other such materials. First and second current sources 132, 134 are provided to supply current to the current electrodes. The current sources 132, 134 are located in the well 110. The first current source 132 is connected to the first and fourth current electrodes 122 and 130 by first current supply and return lines 136, 140 respectively. The second current source 134 is connected to second and third current electrodes 124, 126 by second current supply and return lines 142, 144 respectively. Current supply sources 132, 134 can provide current in a number of forms including direct current or alternating current, including very low frequency alternating current, i.e., alternating current with a very low rate of change with time.

First, second and third receiver electrodes 146, 150, 152, formed of a conductive material such as copper, lead, or comprising non-polarizable electrodes are fixed to the probe 116, in spaced relationship above the first and second current electrodes 122, 124, and below the third current electrode 126. The second receiver electrode 150 lies substantially mid-way between the first receiver electrode 146 and the third receiver electrode 152. The distance from the third receiver electrode 152 to the third current electrode 126 and the distance from the first receiver electrode 146 to the second current electrode 124 are sufficiently small so that, when a current is caused to flow between the second and third current electrodes 124, 126, the difference between the voltage across the first and second receiver electrodes 146, 150 and the voltage across the second and third receiver electrodes 150, 152 will substantially be due to variations in the casing conductivity and receiver electrode placement, as compared to the magnitude of the influence of the formation conductivity. A distance of less than about 10 to 30 meters will suffice for this purpose, in most instances. Preferably, the receiver electrodes 146, 150, 152 will be positioned substantially symmetrically with respect to the second and third current electrodes 124, 126. The distance from the first current electrode 122 to the first receiver electrode 146 is sufficiently large that when a current is caused to flow between the first and fourth current electrodes 122, 130, the current adjacent the first receiver electrode 146 is directed substantially parallel to the longitudinal axis of the well and the majority of the current is carried by the casing 112. A distance of about 10 to 20 times the radius of the well 110 is sufficient. The distance from the third receiver electrode 152 to the fourth current electrode is sufficiently large that when a current is caused to flow between the first and fourth current electrodes 122, 130, the difference between the voltage across the first and second receiver electrodes 146, 150 and the voltage across the second and third receiver electrodes 150, 152 is substantially due to both the influence of the conductivity of the formation 120 adjacent the receiver electrodes 146, 150, 152 and the variations in casing conductivity and receiver electrode spacing.

Data conducting lines 156, 160, 162, which are connected to the receiver electrodes 146, 150, 152, respectively, conduct values related to voltage between the first and second receiver electrodes 146, 150 and values related to voltage between the second and third receiver electrodes 150, 152 to the measuring unit 166. In practice the value which is actually measured is indicative of the ratio of the 2 voltages.

The values relating to voltages across the receiver electrodes are conveyed to the measuring unit 166 typically in the form of electrical signals. These signals can be passed through electrical filters in order to remove certain unwanted noise components of the signal.

A data line 170 can be provided to convey values relating to the magnitude of the currents supplied by current sources 132, 134 to the measuring unit 166. A data line 172 conveys data from the measuring unit 166 to the processor/recorder 174. The measuring unit 166 includes one or more amplifiers, voltmeters, a microcomputer, or a circuit like a bridge, for measuring simultaneously the difference or ratio between two voltages defined between the adjacent pairs of receiver electrodes 146, 150, 152. The processor/recorder 174 receives information relating voltages measured using the receiver electrodes 146, 150, 152. The processor/recorder 174 includes hardware for displaying or recording the data received from the measuring unit 166, together with computer-related hardware for determining the conductivity and/or resistivity of the formation of interest using the measured parameters and a derived relationship combining such parameters.

A reference potential electrode 180 can be provided in contact with the ground. Reference electrode 180 is needed for one of the methods of obtaining absolute value of formation conductivity, described below. If it is not desired to use that method, electrode 180 need not be provided. Reference electrode 180 is connected to the measuring unit 166 by data line 182. Reference electrode 180 is positioned sufficiently far from the receiver electrodes 146, 150, 152 that the electrical field potential measured at second receiver electrode 150 is a usually stable value (i.e. not substantially affected by leakage current or variations in casing conductance) and can be used to obtain an electrical field potential at the second receiver electrode 150 with respect to a reference or "ground" potential. The reference potential electrode 180 can be positioned at the surface or in the borehole.

Before describing the operation of the embodiment of FIG. 1, the basis of operability of the present invention will first be addressed. The present invention relies on measurements of voltage and/or the difference or ratio between two voltages. Using these obtained quantities, as well as other parameters, defined in a derived relationship, the conductivity of the formation of interest can be found.

More specifically, if the formation 120 surrounding the casing 112 were a perfect insulator, substantially all the current applied to the current electrode 122 would flow in parallel through the casing 112 and the well 110. Since, however, the underground formation 120 typically has some finite value of resistivity, there will be some leakage of current into the formation 120. The amount of leakage current at any one level is related to the resistivity of the formation 120 at this level.

Since the casing 112 is typically formed from a highly conductive material, the current through the casing 112 at two various levels in the casing will typically be very much larger than the difference between those currents, which represents the amount of leakage current. It is for this reason that attempts to deduce relative conductivity characteristics of a formation by measuring separately casing currents, require highly sensitive measurements of currents, and relatively large linear extents between measurement points in order to resolve the small amount of difference between the currents flowing at any two levels in the casing.

The present invention, however, involves measurement of voltages caused by a current source. The value obtained depends on the formation conductivity. The invention is also based on the fact that the voltages and/or the differences of the voltages (or the ratios of the voltages) are preferably measured simultaneously.

In conjunction with the determination of the conductivity of an underground formation adjacent to a cased well, the ratio of the formation resistivity laterally adjacent a first measurement location to the formation resistivity laterally adjacent a second measurement location can be expressed by Equation (4) above. The accuracy of results which are based upon Equation (4), as noted above, depends on the validity of the assumptions that (1) the distance between electrodes M and N is equal to the distance between electrodes N and $M_1$; and (2) the casing resistivity between electrodes M and N is equal to the casing resistivity between electrodes N and $M_1$. In order to obtain accurate results using Equation (4) in spite of the fact that assumptions (1) and/or (2) are not met, variations in electrode location and/or casing conductivity are compensated in the manner discussed below.

In FIG. 1, the receiver electrodes M, N, $M_1$ are shown 146, 150, 152, respectively, between the second current electrode 124 and the third current electrode 126. The configuration in which current passes between the second and third current electrodes 124, 126 is used to determine a compensation for the deviations from assumptions (1) and (2) in the following manner. During the flow of the first current between second and third current electrodes 124, 126, values are obtained relating to the voltage between first and second receiver electrodes 146, 150 and second and third receiver electrodes 150, 152. These values can be used to obtain the ratio of resistances between the portions of the casing laterally adjacent the intervals between the receiver electrodes according to the following relationship:

$$\frac{R_{146,150}}{R_{150,152}} = \frac{V^*_{146,150}}{V^*_{150,152}} \tag{5}$$

where:

$R_{146,150}$ = The resistance of the portion of casing laterally adjacent the interval between the first and second receiver electrodes 146, 150;

$R_{150,152}$ = The resistance of the portion of casing laterally adjacent the interval between the second and third receiver electrodes 150, 152;

$V^*_{146,150}$ = Voltage between first and second receiver electrodes 146, 150 in response to a first current flowing between second and third current electrodes 124, 126; and $V^*_{150,152}$ = Voltage between second and third receiver electrodes 150, 152 in response to a first current flowing between second and third current electrodes 124, 126.

The ratio of voltages developed under the influence of the first current can then be used to compensate for variations in electrode location or casing conductivity. The compensated value of $\Delta V_{1e}$ is denoted $\Delta V_{1e}'$, where the prime indicates a compensation of $\Delta V_{1e}$ (defined above after Equation (3)) for the effects of variations in casing conductivity and electrode placement. A value for $\Delta V_{1e}'$ can be obtained using either of the following relations:

$$\Delta V_{1e}' = V_{146,150} - \frac{V^*_{146,150}}{V^*_{150,152}} V_{150,152} \tag{6}$$

where:

$\Delta V_{1e}'$ is the voltage across first and second receiver electrodes 146, 150 minus the compensated voltage across second and third receiver electrodes 150, 152 in response to a second current flowing between first and fourth current electrodes 122, 130 said compensation being for variations in electrode spacing and casing conductance;

$V_{146,150}$ is the voltage across first and second receiver electrodes 146, 150 in response to a second current flowing between first and fourth current electrodes 122, 130; and $V_{150,152}$ is the voltage across second and third receiver electrodes 150, 152 in response to a second current flowing between first and fourth current electrodes 122, 130; or $$\Delta V_{1e}' = V_{150,152} - \frac{V^*_{150,152}}{V^*_{146,150}} V_{146,150} \tag{7}$$

where:

$\Delta V_{1e}'$ is the voltage across second and third receiver electrodes 150, 152 minus the compensated voltage across first and second receiver electrodes 146, 150 in response to a second current flowing between first and fourth current electrodes 122, 130.

The relationship of the voltage due to leakage, which is the value sought, to the voltage difference which is due to variations in casing conductivity or electrode location is expressed in Equation (8):

$$\Delta V_{total} = \Delta V + \Delta V_{noise} \tag{8}$$

where:

$\Delta V_{total}$ is the voltage across first and second receiver electrodes 146, 150 minus the voltage across second and third receiver electrodes 150, 152 in response to a second current flowing between the first and fourth current electrodes 122, 130, or $V_{146,150} - V_{150,152}$; and $\Delta V_{noise}$ is that portion of $\Delta V_{total}$ which practically represents the noise signal produced by variations in casing conductivity and/or receiver electrode location.

Previous methods have attempted to derive an indication of formation conductivity only from $\Delta V_{Total}$, and thus were content to directly measure $\Delta V_{Total}$. It is important to note that the present method does not measure $\Delta V_{Total}$, i.e. $V_{146,150} - V_{150,152}$. Rather, $\Delta V_{noise}$ is measured and is subsequently used to obtain $\Delta V_{1e}'$.

If $\Delta V_{1e}'$ is obtained at two locations along the borehole, Equation (6) or (7) can be used to form an expression giving the ratio of the respective resistivities of the formations laterally adjacent to the two locations where measurements are made by using the relationship:

$$\frac{\rho_2}{\rho_1} = \frac{\Delta V_{1e'}^{(1)}}{\Delta V_{1e'}^{(2)}} \quad (9)$$

In practice, it is preferable to slightly modify Equations (6) and (7) so that measurements can be made which relate to the ratio of measured values, rather than to the difference of measured values, as indicated in the following relationships:

$$\frac{\Delta V_{1e'}}{V_{146,150}} = 1 - \frac{V^*_{146,150}}{V^*_{150,152}} \frac{V_{150,152}}{V_{146,150}} \quad (10)$$

$$\frac{\Delta V_{1e'}}{V_{150,152}} = 1 - \frac{V^*_{150,152}}{V^*_{146,150}} \frac{V_{146,150}}{V_{150,152}} \quad (11)$$

Equations (10) and (11) are amenable to the use of relatively simplified electronic measuring circuitry which can directly output a value related to the ratio of two measured values, as compared to the more complicated electronics or calculations required to obtain the difference between measured values. Measurement of a ratio rather than calculation of a difference also has the advantage that the ratio measurement is less affected by changes in the current. If a difference is calculated between two voltage measurements, it is possible for current to change between the time the first voltage measurement is taken and the time the second voltage measurement is taken. Measurement of a ratio at least partly overcomes this problem.

As can be seen from the foregoing relationships, different current values at various points in the well are not required. Instead, measurements of voltages over two sections of the well are made. Such voltages can be measured over sections of the well as small as 0.5 to 1 meter.

Equations (6)-(11) can be algebraically manipulated into other forms or other formulas can be devised and still be used for the practice of this invention, provided a value relating to voltages developed in response to a current through current electrodes located relatively close to receiver electrodes is used to compensate a value relating to voltages developed in response to a current where at least one current electrode is located relatively far from the receiver electrodes, for variations in casing conductivity and receiver electrode locations.

The operation of the embodiment of FIG. 1 will now be described. The probe 116 is placed within the well 110 adjacent to the portion of the formation 120 whose conductivity is to be obtained. The second current supply source 134 is placed in operation and the second current travels through the second current supply line 142 to the second current electrode 124, flows to the third current electrode 126 through the casing and conductive fluid in the borehole such as drilling mud (the probe 116 itself is not conductive), whence it returns by return line 144 to the second current source 134. A value relating to the voltage across first and second receiver electrodes 146, 150 is conveyed to the measuring unit 166 by data lines 156, 160. A value relating to the voltage across second and third receiver electrodes 150, 152 is conveyed to the measuring unit 166 by data lines 160, 162. These values are used to obtain a value relating to the ratio of $V^*_{146,150}$ to $V^*_{150,152}$ or the difference between $V^*_{146,150}$ and $V^*_{150,152}$.

The ratio of $V^*_{146,150}$ to $V^*_{150,152}$ is related to the ratio of resistance $R_{146,150}$ to $R_{150,152}$. This ratio can be used to compensate for variations in electrode location and casing conductivity in two ways.

According to the first method of compensation, the ratio of the $V^*_{146,150}$ to $V^*_{150,152}$ or the difference between $V^*_{146,150}$ and $V^*_{150,152}$ is transmitted by data line 172 to the processor/recorder 174. The second current source 134 is discontinued, and the first current source 132 is activated to produce a current between first and fourth current electrodes 122, 130. The first current travels through the first current supply line 136 to the first current electrode 122. The first current is initially directed radially outward, and then, after a distance of 10 to 20 times the radius of the well 110, begins to change orientation and, within a certain range of distances, is directed axially along the casing 112. At one or more points along the casing 112 a portion of the second current leaks from the casing 112 into adjacent formation. The magnitude of this leakage current is related to the resistivity of the adjacent formation. This leakage current travels through the formation to the fourth current electrode 130 which is at some distance spaced from the probe. Current then travels back by return line 140 to the first current source 132 to complete the circuit. Because the first and fourth current electrodes 122, 130 are spaced relatively far from the receiver electrodes 146, 150, 152 the current flow lines in the vicinity of electrodes 146, 150, 152 are directed substantially parallel to the longitudinal axis of the well. At this distance, also, the majority of the current is carried by the casing 112. The voltage will have substantially the same value along the same vertical interval, regardless of whether it is measured at the casing 112 or within the well 110 spaced from the casing 112.

In order for the difference in voltages across the first and second receiver electrodes 146, 150 and second and third receiver electrodes 150, 152 to relate to both the current leakage into the adjacent formation 120 and the variations in casing conductivity and electrode location, as desired, it is necessary for the fourth current electrode 130 to be sufficiently spaced from the receiver electrodes 146, 150, 152. It has been found that in a cased or partly cased well with a radius of e.g. about 10 centimeters, the fourth current electrode 130 must be at least about 200–300 meters from the receiver electrodes 146, 150, 152. This is conveniently achieved by positioning the fourth current electrode 130 on the surface, in electrical contact with the ground.

The measuring unit 166, by means of the data conducting lines 156, 160, 162, respectively, outputs the values of the voltages across first and second receiver electrodes 146, 150 and across the second and third receiver electrodes 150, 152. As noted above, in practice it is preferred to measure the ratio between voltages $V_{146,150}$ and $V_{150,152}$. This ratio is conducted by data line 172, to the processor/recorder 174.

The relative magnitude of the conductivity of that portion of the formation 120 adjacent the receiver electrodes 150, 152 is obtained by algebraically combining the measured voltages according to Equation (6) or (7), or, preferably, according to Equation (10) or (11). By repeating the process after moving the probe 116 to another location, Equation (9) is used to obtain a ratio of formation conductivities.

According to the second method of compensating for electrode location and casing conductivity variations, an electronic circuit is connected across the first and second receiver electrodes 146, 150 and/or the second and third receiver electrodes 150, 152. During the time the second current is flowing from the second current source 134, to the second current electrode 124, the third current electrode 126 and back to the second current source 134, one or both of these electronic circuits are adjusted to electronically compensate for variations in electrode placement or casing conductivity. The specifics of this compensation method depend in part on whether the ratio or the difference between voltages is measured. In the former case, if the ratio of $V^*_{146,150}$ to $V^*_{150,152}$ is significantly different from 1, an electronic circuit such as a bridge circuit with variable resistances or an amplifier with variable gain is connected across the first and second receiver electrodes 146, 150 and/or the second and third receiver electrodes 150, 152. The voltage across both the first and second receiver electrodes 146, 150, and the electronic circuit connected therebetween is now measured to give a new value for $V^*_{146,150}$. Similarly, a new value for $V^*_{150,152}$, including both the voltage across second and third receiver electrodes 150, 152 and across the electronic circuitry therebetween (if any), is measured. One or both of the electronic circuits are adjusted until the ratio of $V^*_{146,150}$ to $V^*_{150,152}$, including the electronic circuits, is about 1, and in particular is sufficiently close to 1 that the compensated voltages obtained as described below represent a useful signal, indicating formation conductivity which is discernable with respect to the "noise" contribution to voltage arising from variations in casing conductivity and/or electrode placement.

When the difference between $V^*_{146,150}$ and $V^*_{150,152}$, rather than the ratio, is measured, the same method for electronic compensation can be used except that, rather than adjusting the electronic circuitry to obtain a ratio of about 1, the electronic circuitry is adjusted so as to minimize the difference between $V^*_{146,150}$ and $V^*_{150,152}$. That is, rather than adjusting the circuitry to obtain a ratio which is about 1, the circuitry is adjusted to obtain a difference of about 0.

At this point, the second current source 134 is discontinued and the first source 132 is initiated. The flow of first current is virtually the same as that described above in connection with the first method for compensation. However, because the electronic circuits previously connected between the receiver electrodes are still in place, the voltage difference which is due to variations in electrode locations and casing conductivity are electronically "factored out" so that the difference between the voltage across the first and second receiver electrodes 146, 150 (and the electronic circuitry therebetween) and the voltage across second and third receiver electrodes 150, 152 (and the electronic circuitry therebetween) does not represent $\Delta V_{total}$, but is related to the conductivity of the adjacent formation 120, without the necessity for further compensation. The ratio between these two voltages is conveyed by data line 172 to processor/recorder 174.

As is well known in the electronic art, any electronic circuit which is used in the above method will inevitably have departures from the ideal electronic characteristics. For example, a particular amplifier may have a non-linear response such that even when it is properly adjusted so as to provide the desired minimization of $V^*_{146,150} - V^*_{150,152}$, during the time the second current source 134 is providing current, the same amplifier may not provide the desired compensation in response to the first current, which may have a different magnitude or waveform. The departure of the electronic circuits from ideal behavior or response can be at least partially taken into account by providing two or more electronic circuits for connecting across the first and second receiver electrodes 146, 150 and/or two or more electronic circuits for connecting across the second and third receiver electrodes 150, 152. By using the average of measurements taken when each pair of receiver electrodes is connected with the two or more provided electronic circuits, the effects of departures of each amplifier from ideal electronic characteristics is taken into account.

Although the methods described above involve sequential application of a first current and then a second current, the method can be conducted by simultaneous application of the first and second currents, provided these currents are in such form as to allow discrimination between those voltages at the receiver electrodes 146, 150, 152, which derive from the first current and those voltages which derive from the second current. Such discrimination can be effected by providing one of the two currents as direct current while providing the other of the two currents as an alternating current, or providing the two currents in the form of alternating currents of different frequencies or waveforms.

After the above described measurements are taken at a given location, the probe 116 is moved to a second location and the process is repeated. In this way, the ratio of the resistivity of two formations can be obtained.

When one or both of the current sources 132, 134 provide alternating current, it is preferable to measure the voltage through several cycles of the current in order to determine a proper average value. Since the length of time which will be required at a particular location will increase as the frequency is decreased, speed of measurement will be expedited by using higher frequencies. On the other hand, higher frequencies can be expected to produce an unwanted amount of inductive reactance in the casing 112 which will place an upper limit on the practical frequency which can be used. The actual value of this frequency will largely depend on the inductive characteristics of the materials from which the casing 112 is made. If the casing 112 is of such a material that a relatively high frequency, such as about 20–40 hertz, can be used, the amount of time required for any one location will be so short that the measurement method can be substantially continuous in the sense that the probe 116 can be drawn through the well in a continuous manner.

Another difficulty with using an alternating current as one or more of the current sources 132, 134, is that the inductive reactance created in the casing 112 will result in a phase shift of the voltage between first and second receiver electrodes, 146, 150 with respect to the voltage between second and third receiver electrodes 150, 152. Specifically, if an alternating current source develops a time dependent voltage across first and second receiver electrodes 146, 150, having the form $$V_{146,150} = V(\omega t), \tag{12}$$

inductive reactance can cause a phase shift in the voltage occurring across receiver electrodes 150, 152 having the form $$V_{150,152} = V(\omega t + \phi) \quad (13)$$

This phase shift can be accounted for in any manner well known in the electronic art such as calculating or measuring only the real portion of the voltages of Equations (12) and (13).

By conducting the above-described method at a plurality of locations within the well, it is possible to construct a profile of the relative resistivities of the formations adjacent to the cased well.

The present invention, besides being useful in constructing a profile of relative resistivities, can be used to obtain the absolute values of the resistivities of formations adjacent to the well. Several methods can be used to obtain this result. In some situations, the absolute value of one or more of the formation layers is known from independent sources, such as by a direct measurement of conductivity, or because of a knowledge of the character of the particular formation. A knowledge of the absolute value of one formation layer can be combined with the knowledge of the ratio of relative resistivities of layers above and below this formation to calculate the absolute value of all formation layers above and below the layer of known absolute resistivity.

Alternative methods for obtaining the absolute value of formation conductivity can be used to obtain a direct indication of formation conductivity, even when the absolute value of a layer is not independently known. According to one method, the formation whose absolute conductivity is to be determined must be at least as thick as the distance between the receiver electrodes. This method is based on the well-known relationship, derived from theoretical considerations:

$$\frac{d^2 U}{dz^2} = a^2 U \quad (14)$$

where:

U is the electric potential at any point along the borehole with respect to ground or zero potential;

Z is a distance along the borehole axis; and $a$ is the value defined above in relation to Equation (2).

Application of Equation (14) to obtain a direct indication of formation conductivity can be made only because leakage voltage can be obtained using the method of this invention. By this means, formation conductivity can be directly obtained by using the following relationship:

$$\sigma_f = S_{av} \frac{1}{(Z_{150} - Z_{146})^2} \cdot \frac{\Delta V_{1e}'}{U_{150}} \quad (15)$$

where:

$Z_{150} - Z_{146}$ is the axial distance in meters between first and second receiver electrode 146, 150;

$\Delta V_{1e}'$ is obtained from Equation (6);

$U_{150}$ is the electrical field potential at the second receiver electrode 150, in volts with respect to a reference "ground" potential, such as the potential of electrode 180, located sufficiently far from the second receiver electrode 150 that potential $U_{150}$ is usually a stable value, i.e. is not substantially affected by leakage current or variations in casing conductance; and $S_{av}$ is the average casing conductance in the region of the receiver electrodes obtained by:

$$S_{av} = \frac{2 \cdot I_o \cdot MN}{V^*_{146,150} + V^*_{150,152}} \quad (16)$$

where:

MN is the distance between the first and second receiver electrodes 146, 150 and where this distance is substantially equal to the distance between the second and third receiver electrodes 150, 152; and $I_o$ is the magnitude of the first current flowing between the second and third current electrodes.

In order to obtain a value for $U_{150}$, it is necessary to obtain a reference "ground" potential. A reference potential can be measured using electrode 180. Thus, $U_{150}$ can be obtained by connecting a device for measuring voltage such as a voltmeter or the like between receiver electrode 150 and reference potential electrode 180.

Figure 2:
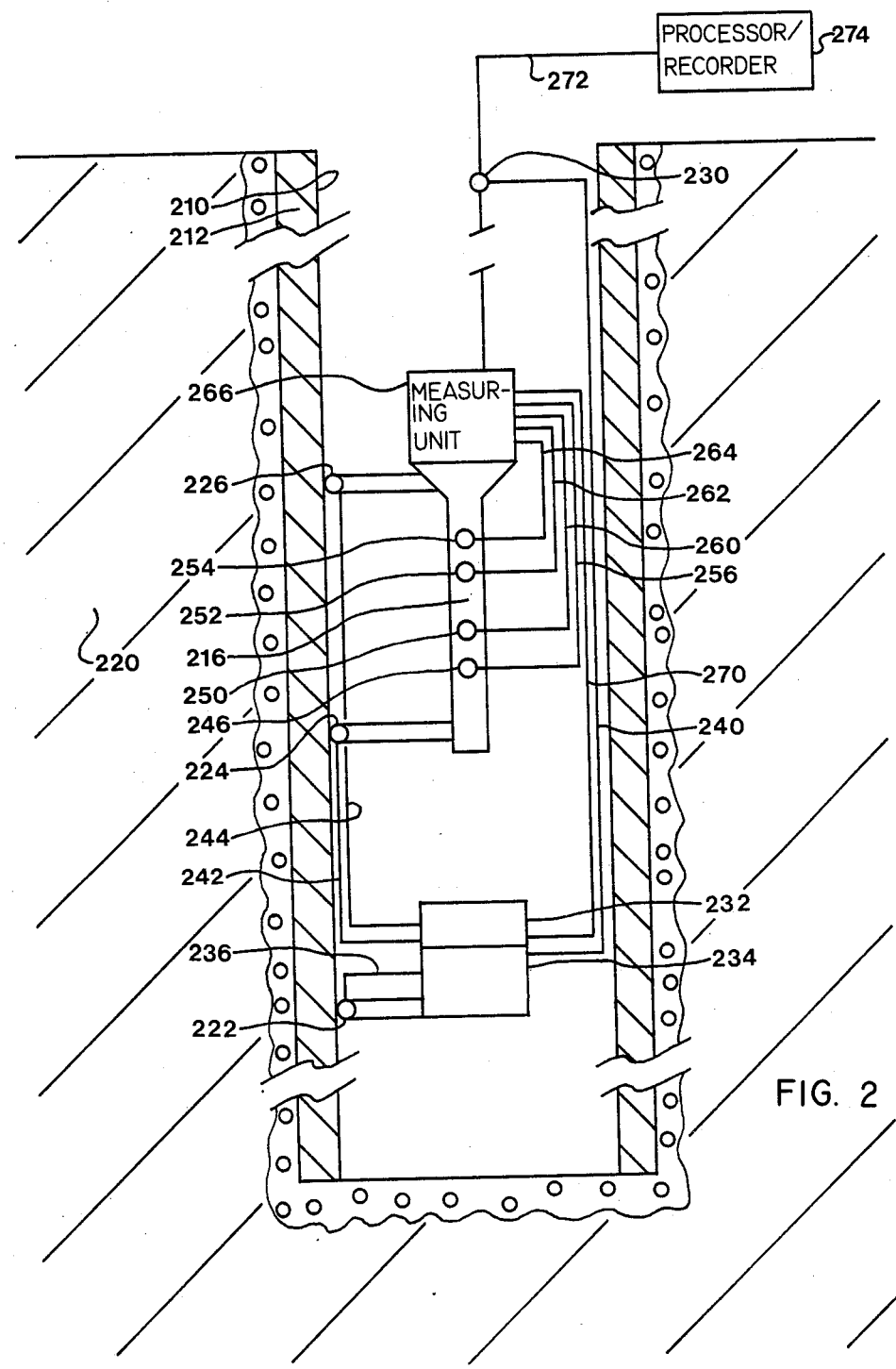
FIG. 2 is a diagramatic view of a cased well showing two current electrodes in electrical contact with the well casing, a current electrode disposed in the well and with four receiver electrodes for measuring electrical parameters useful in the practice of the present invention.

Another method for obtaining the absolute values of formation resistivities can be best understood by reference to FIG. 2. A well 210, lined with a conductive casing 212 has disposed within it a probe to 216 adjacent the formation of interest 220. Also disposed within the well 210 is a first current electrode 222 physically separate from the probe 216. In this embodiment, the current electrode 222 can be kept in a fixed position within the well 210 while the probe 216 is moved upward in the well. Second and third current electrodes 224, 226 are positioned in the vicinity of the formation of interest 220. A fourth current electrode 230 is shown positioned within the borehole, rather than being positioned on the surface (although a position on the surface in the manner depicted in FIG. 1 is also operable). The second and third current electrodes 224, 226 are sufficiently close to the receiver electrodes 246, 250, 252, 254, and preferably positioned substantially symmetrically with respect to the receiver electrodes, that when a first current flows between the second and third receiver electrodes 224, 226, the difference between the voltage across the first and second receiver electrodes 246, 250 and the voltage across the third and fourth receiver electrodes 252, 254 substantially reflects variations in casing conductivity and receiver electrode location, compared to the influence of formation conductivity. The fourth current electrode 230 is spaced sufficiently far from the receiver electrodes 246, 250, 252, 254 that when current passes between the first and fourth current electrodes 222, 230, the difference in the voltage across the first and second receiver electrodes 246, 250, and the voltage across the third and fourth receiver electrodes 252, 254, is substantially due to both influence of the conductivity of the formation adjacent the receiver electrode 220, and the variations in casing conductivity and receiver electrode spacing.

A first current source 232 is used to provide a first current which flows via line 242 to the second current electrode 224 and thence to the third current electrode 226, returning to the first current source 232 by return line 244. A second current source 234 is used to provide a second current which flows via current supply line 236 to the fixed current electrode 222 and thence to the fourth current electrode 230, returning to the second current source 234 via return line 240. The probe 216 is provided with four receiver electrodes 246, 250, 252, 254. In this configuration, voltages, in response to both the first current and the second current are measured across the first and second receiver electrodes 246, 250 and across the third and fourth receiver electrodes 252, 254. Data lines 256, 260, 262, 264 convey signals relating to the values of the voltages across the receiver electrodes 246, 250, 252, 254, respectively, to the measuring unit 266. A data line 270 can be provided to convey signals relating to the values of the first and second currents to the measuring unit 266. Data line 272 conveys data from the measuring unit to the processor/recorder unit 274.

The manner of operation of the embodiment shown in FIG. 2 will now be discussed. As the probe 216 is moved upward, values of relative resistivity are obtained, in the same manner as that described above in connection with FIG. 1, at locations increasingly removed from the fixed electrode 222. At each location, the ratio of $\Delta V_{1e}$ at that location to $\Delta V_{1e}$ at the previous location is obtained. When a location is reached where the thickness of a substantially uniformly conductive formation 120 adjacent the receiver electrodes is sufficiently great, the value of $\Delta V_{1e}$ is observed to decrease exponentially, i.e.

$$\frac{\Delta V_{1e}^{(n)}}{\Delta V_{1e}^{(n-1)}} = e^{-\alpha(Z_n - Z_{n-1})} \quad (17)$$

Where $\Delta V_{1e}^{(n)}$ is the value of $\Delta V_{1e}$ measured at location n;

$\Delta V_{1e}^{(n-1)}$ is the value of $\Delta V_{1e}$ measured at a location n−1, below n;

$Z_n - Z_{n-1}$ is the vertical distance between locations n and n−1; and $\alpha$ is the value defined above in relation to Equation (2).

At a location where the value of $\Delta V_{1e}$ is observed to decrease exponentially, the conductivity of the formation surrounding that location can be calculated according to the following relation:

$$\sigma_f = \frac{S_c}{(Z_n - Z_{n-1})^2} \left| \ln \frac{\Delta V_{1e}^{(n)}}{\Delta V_{1e}^{(n-1)}} \right|^2 \quad (18)$$

Where $\sigma_f$ is the formation conductivity in mhos per cm;

$S_c$ is the casing conductance in mhos; and $Z_n - Z_{n-1}$ is in cm.

The value of the casing conductance $S_c$ can be obtained by a number of tools for measuring conductance, well known in the art, such as use of an inductive coil or similar tools. Alternatively, casing conductance can be obtained from the magnitude of the first current flowing between the second and third current electrodes, $I_o$, and the voltage developed across the receiver electrodes. Preferably, the average of the casing conductivity between the first and second receiver electrodes and the conductivity between the second and third receiver electrodes is used, obtained from Equation (16).

Since, because of previous measurements, the ratio of the conductivity of each layer to the next lower layer is known, once the absolute value of the conductivity of one layer is known, the conductivity of all other layers can be calculated.

Besides providing for a fixed current electrode physically separated from the probe 216, it will be noted that the embodiment depicted in FIG. 2 also provides a number of other variations on the hardware and apparatus shown in FIG. 1.

The fixed current electrode 222 and the second and third current electrodes 224, 226 are placed in electrical contact with the casing 212. Such contact can be provided by a number of hardware configurations known in the art such as by spring loaded contact members. By employing such direct electrical contact mechanisms, the current electrodes of FIG. 2 can be used in a well environment which does not contain a conductive fluid for conducting the current between the first, second and third current electrodes 222, 224, 226 and the casing 212.

Figure 3:
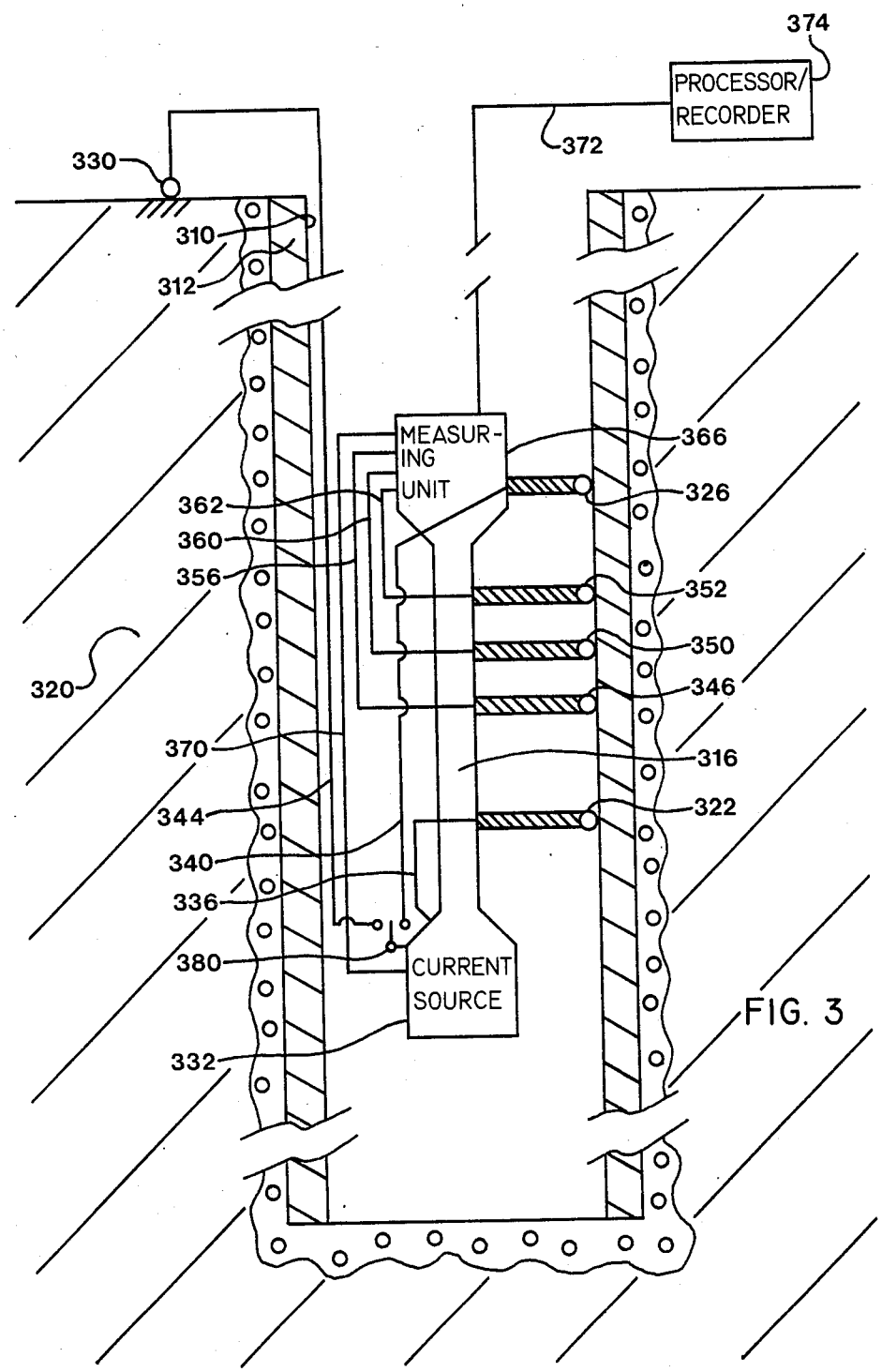
FIG. 3 is a diagrammatic view of a cased well showing two current electrodes and three receiver electrodes in contact with the well casing.

Still further variations on the hardware which can be used with the present invention are depicted in FIG. 3. In this embodiment, a borehole 310 having a conductive casing 312 has disposed within it a probe 316 in the vicinity of a formation of interest 320. First and second current electrodes 322, 326 are provided in electrical contact with the casing 312. The first and second current electrodes are sufficiently close to first, second and third receiver electrodes 346, 350, 352 that when current flows between the first and second current electrodes 322, 326, the difference between voltage across the first and second receiver electrodes 346, 350, and the voltage across the second and third receiver electrodes 350, 352 is substantially due to variations in casing conductivity and receiver electrode location, as compared to the influence of differences in formation conductivity. A third current electrode 330 is provided in electrical contact with the ground. The third current electrode 330 is spaced sufficiently far from the receiver electrodes 346, 350, 352, that when current flows between the first and third current electrodes 322, 330, differences between the voltage across the first and second receiver electrodes 346, 350, and the voltage across the second and third receiver electrodes, 350, 352 reflect the influence of the formation conductivity, as well as the influence of casing conductivity and receiver electrode location. A current source 332 provides current to the first current electrode 322 by current line 336. Current return lines 340 and 344, respectively, provide for return of current from the second and third current electrodes 326, 330 to the current source 332. First, second and third receiver electrodes 346, 350, 352 are provided in direct electrical contact with the well casing 312. Data lines 356, 360, 362 carry signal information relating to the voltages across the first and second receiver electrodes 346, 350 and the second and third receiver electrodes 350, 352 to the measuring unit 366. A data line 370 can be provided to convey information relating to the magnitude of the current source 332 to the measuring unit 366. A data line 372 conveys data from the measuring unit 366 to the processor/recorder unit 374.

The current source 332 provides current to the first current electrode 322 by current line 336. Current returns to the current source from either the second current electrode 326 or the third current electrode 330, depending on the position of the switch 380. In a first position, switch 380 completes a circuit between the current source 332 and the second current electrode 326 by means of the first current return line 340. When switch 380 is in a second position, the circuit is completed by the return of current through the third current electrode 330 by means of the second current return line 344.

In operation, the switch 380 is set in the first position to provide a current flowing from the current electrode 322, upward through the casing to the second current electrode 326. The data concerning the voltages across the receiver electrodes when switch 380 is in the first position are used to provide compensation for the effects of electrode location and casing conductivity. Compensation can be accomplished by one of the methods discussed above with respect to the embodiment of FIG. 1, i.e., by manual or electronic calculation, or by providing a compensating electronic circuit between two or more of the receiver electrodes 346, 350, 352.

Switch 380 is then set in the second position so that the current flows from the current electrode 322 to the remotely positioned third current electrode 330 and thence returns to the current source 332 by return line 344. The third current electrode 330 is located sufficiently far from the receiver electrodes 346, 350, 352 that current in the vicinity of the receiver electrodes 346, 350, 352, as in the embodiment of FIG. 1, is directed substantially parallel to the axis of the borehole 310. The voltage across the first and second receiver electrodes 346, 350 and across the second and third receiver electrodes 350, 352 are conveyed to the measuring unit 366 and compensated as discussed above. The values related to the relative conductivity of the formation 320 adjacent to the receiver electrodes is passed by data line 372 to the processor/recorder 374. This method can be repeated at a plurality of locations within the borehole 310 in order to provide either a profile of relative formation resistivities, or values of the absolute formation resistivities as described above in connection with the embodiments of FIG. 1 or 2.

Although the methods and apparatus of the present invention are particularly useful because they provide a practical method for well logging in cased wells, this same method and apparatus, with certain modifications, can be used to perform well logging in partially cased or in uncased wells. Wells are partially cased in response to a number of conditions which can be encountered in a borehole, such as particularly weak formations intersected by the borehole or fluid-bearing strata where it is desired to prevent leakage of the fluid into the borehole.

Figure 4:
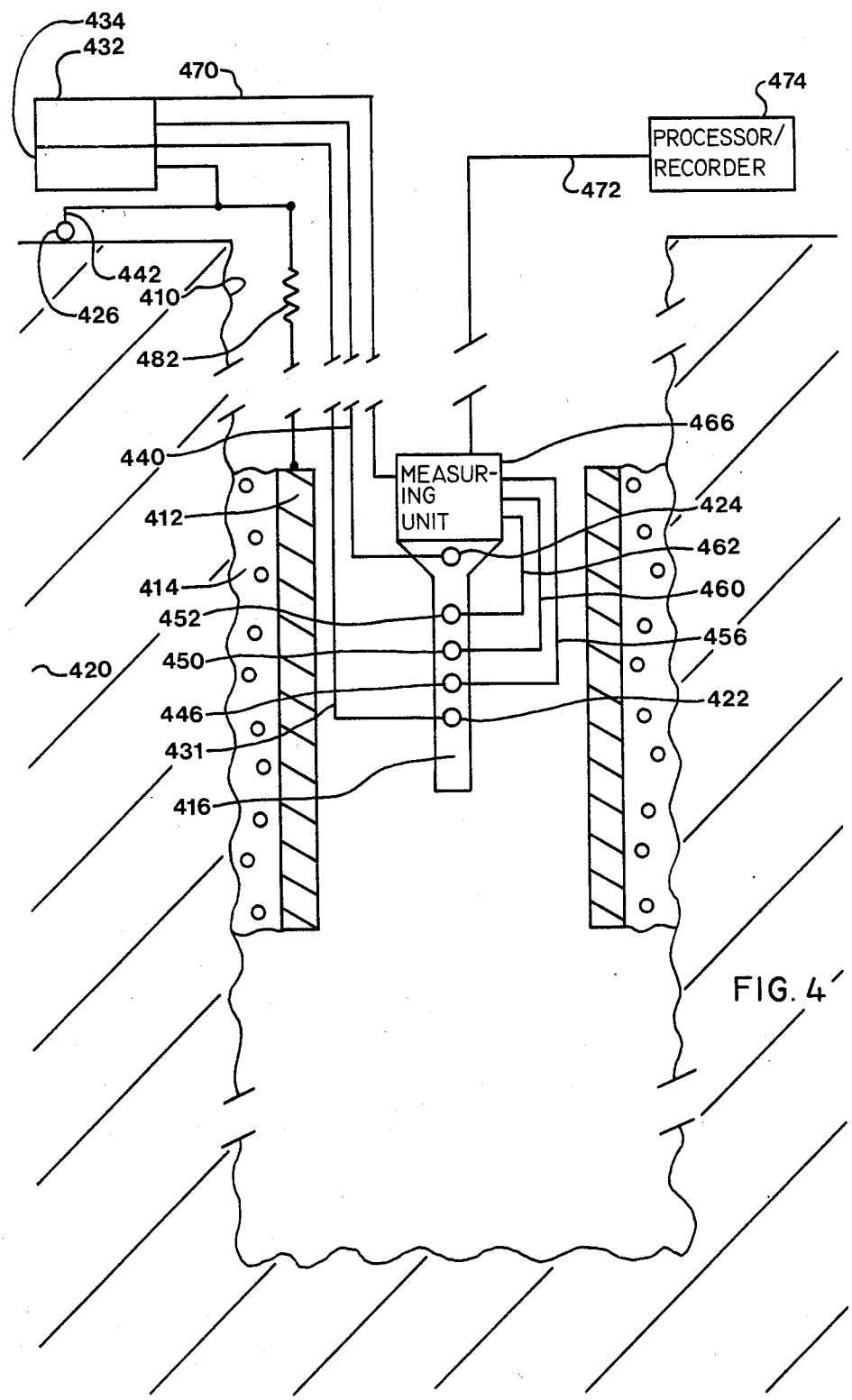
FIG. 4 is a diagrammatic view of a partially cased well including a probe with current electrodes and receiver electrodes and in which a terminal resistance is used.

As depicted in FIG. 4, a borehole 410 contains casing material 412 extending through part of the length of the borehole 410. The casing 412 can be held in place by cement 414. A probe 416 is positioned laterally proximate to a formation 420 adjacent to the cased portion of the well. The probe 416 contains first and second current electrodes 422, 424. First and second current electrodes 422, 424 are positioned sufficiently close to the receiver electrodes 446, 450, 452, that when current flows between the first and second current electrodes 422, 424, the difference between voltage across the first and second receiver electrodes 446, 450, and the voltage across the second and third receiver electrodes 450, 452, is substantially due to variations in casing conductivity and receiver electrode spacing, compared to the influence of variations in formation conductivity. First and second current electrodes 422, 424, are preferably positioned substantially symmetrically with respect to the receiver electrodes 446, 450, 452. A third current electrode 426 is connected through a terminal resistance 482 to the casing 412 and is positioned outside the well in electrical contact with the ground. The third current electrode 426 can be in contact with the ground at the surface, as shown, or in the borehole 410. First and second current sources 432, 434 are connected to the first, second and third current electrodes 422, 424 426, respectively by current supply line 431, and return lines 440, 442. First, second and third receiver electrodes 446, 450, 452 are positioned on the probe 416 below the second current electrode 424. Data lines 456, 460, 462 convey values relating to voltages across the receiver electrodes 444, 450, 452 to the measurement unit 466. A data line 470 can be provided to supply values relating to the magnitude of the current sources 432, 434 to the measuring unit 466. Data line 472 is used to provide values obtained by the measuring unit to the processor/recorder 474.

In order to allow for the fact that the casing 412 is relatively short compared to the casing typically found in a fully cased well, the third current electrode 426 is electrically connected to the casing 412 by means of a terminal resistance 482. The value of this terminal resistance 482 depends on a number of factors including the length of the casing 412 and the material composition of the casing 412.

In order to understand the purpose and function of the terminal resistance 482, it is helpful to consider the situation when terminal resistance 482 takes on extreme values, namely zero resistance or infinite resistance. If terminal resistance 482 had a value of zero resistance, the current, after flowing from the first current electrode 422 through the casing 412 would encounter virtually no resistance through the remainder of its path back to the current source 434. Because of the very low resistance of this current path as compared to resistance to current leakage through the surrounding formation 420, leakage current through the formation 420 will be extremely small and virtually impossible to measure.

If the terminal resistance 482 had an infinite value, there would be an open circuit between the casing 412 and the current source 434 so that virtually no current would flow through the casing 412. Because of the lack of any significant current through the casing 412, there will be virtually no voltage developed across the receiver electrodes 446, 450, 452 so that measurement of current leakage will be impractical.

Thus, the terminal resistance 482 should be provided with a value small enough so that sufficient current can flow through the casing 412 to develop a measurable voltage across the receiver electrodes 446, 450, 452, but large enough that a sufficient amount of current will leak through the formation 420 to enable detection of voltage across the receiver electrodes 446, 450, 452 in response to variations of formation resistivity. Any value which provides these desired results can be used for the terminal resistance. A value on the order of about 1 ohm has been found to be operable in connection with a casing approximately 30 meters in length which is made of steel.

An alternative to the use of the terminal resistance 482 is placement of the third current electrode 426 in contact with the ground a sufficient distance from the casing 412 that the resistance of the intervening ground supplies the resistance otherwise supplied by the terminal resistance 482. In most cases a distance of about 100 meters suffices for this purpose.

The operation of the embodiment depicted in FIG. 4 is similar to that of previously described embodiments. Current is caused to flow from the first current electrode 422 through the casing 412 to the second current electrode 424 and, by return line 440, back to the first current source 432, in order to obtain values related to variations of the electrode location and casing conductivity. Sequentially or simultaneously, a second current from the second current source 434 is caused to flow between the first current electrode 422 and a remotely located third current electrode 426 and thence returns via return line 422 to the second current source 434. Values relating to the voltages across receiver electrodes 446, 450, 452, after compensation for the influence of variation in electrode location and casing conductivity, in the manner described above in connection with the previous embodiments, are passed to the processor/recorder 474.

Figure 5:
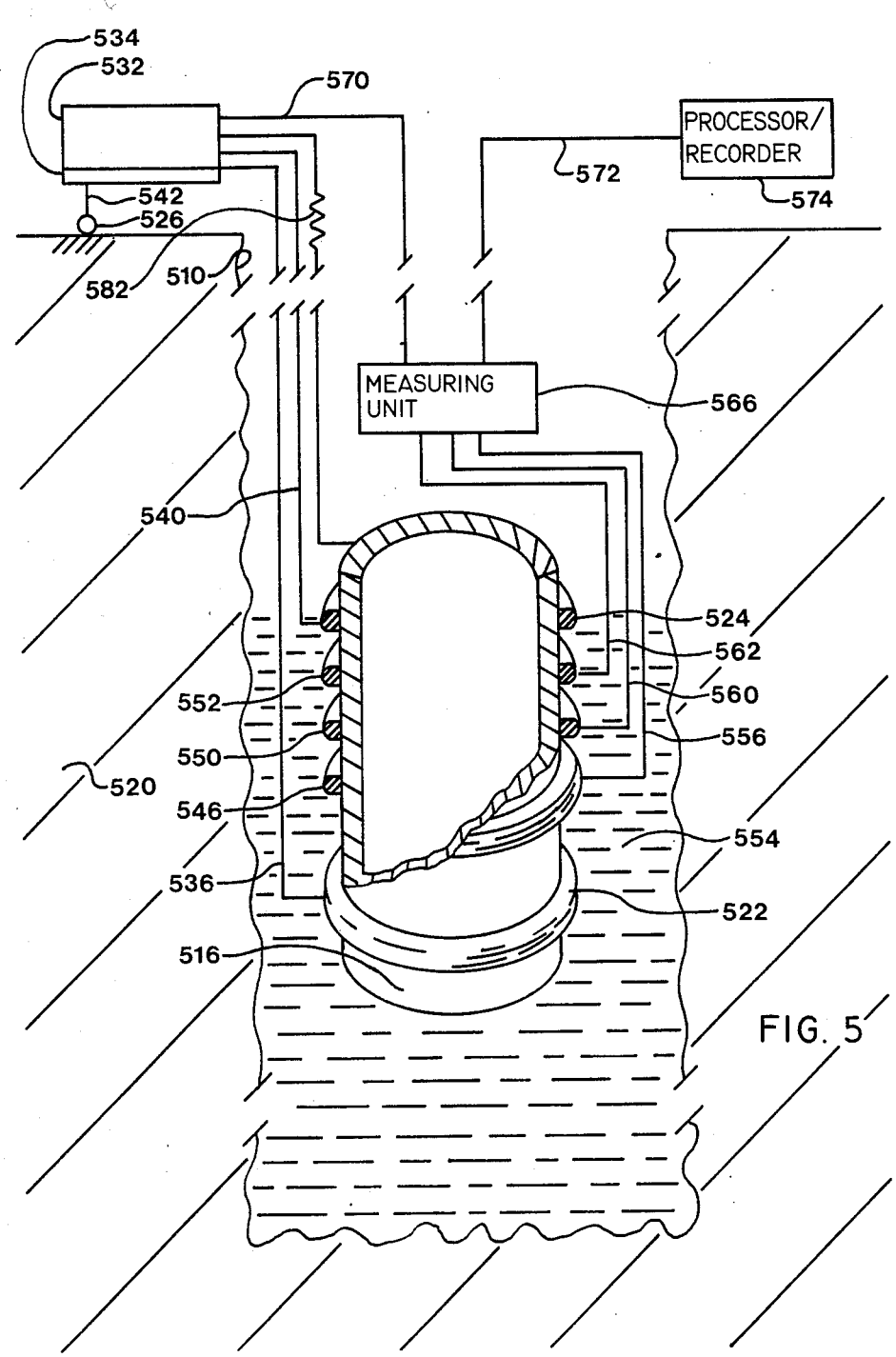
FIG. 5 is a diagrammatic view of an uncased well with a probe partially broken away to show a conductive portion, two current electrodes and three receiver electrodes.

FIG. 5 depicts an embodiment for measurement of the resistivity of formations intersected by an uncased well 510. The apparatus used in this embodiment can be generally described as an "artificial" casing having electrodes positioned thereon. Thus, probe 516 is provided generally in a cylindrical shape formed of a conductive material, such as steel, copper, etc. This probe is placed within the well 510 in the proximity of the formation 520 to be investigated. Provided on the probe 516 are first and second current electrodes, 522, 524. First and second current electrodes 522, 524 are positioned sufficiently close to the receiver electrodes 546, 550, 552 that when current flows between the first and second current electrodes 522, 524, the difference between voltage across the first and second receiver electrodes 546, 550, and the second and third receiver electrodes 550, 552 is substantially due to variations in probe conductivity and receiver electrode spacing, compared to the influence of formation conductivity. A third current electrode 526 is provided remotely located from the well 510 in electrical contact with the ground. The third current electrode 526 is spaced sufficiently far from the probe 516 that when current flows between the first and third current electrodes 522, 526, the difference between the voltage across the first and second receiver electrodes 546, 550, and the voltage across the second and third receiver electrodes 550, 552 reflects the influence of the conductivity of the formation adjacent the receiver electrode 520, as well as the influence of variations in probe conductivity and receiver electrode spacing. A distance of about 100 meters is sufficient in most cases.

First and second current sources 532, 534 are connected to the first, second and third electrodes 522, 524, 526 by current supply line 536, and return lines 540, 542 in the manner described in connection with the previous embodiments. Also provided on the probe 516 are first, second and third receiver electrodes 546, 550, 552. First and second current electrodes 522, 524 and first, second and third receiver electrodes 546, 550, 552 are depicted in the form of ring-like structures attached to the outer periphery of the probe 516. Since these electrodes are spaced from the wall of the borehole 510, this embodiment requires that the probe 516 be used in a well which contains a conductive medium 554 in order to convey current to the surrounding formation 520. The electrodes 522, 524, 546, 550, 552 can also be provided in a form to make direct electrical contact with the wall of the borehole 510 by using spring-loaded devices such as those well known in the art.

Data lines 556, 560, 562 provides values related to the voltages across receiver electrodes 546, 550, 552 to the measuring unit 566. A data line 570 can be provided to provide values relating to the magnitude of the first and second current sources 532, 534 to the measuring unit 566. Data line 572 conveys data from the measuring unit to the processor/recorder 574. Terminal resistance 582 is provided between the current sources 532, 534 and the top of the conductive probe 516 and operates in a manner analogous to terminal resistance 482 described in connection with the embodiment depicted in FIG. 4.

The operation of the embodiment depicted in FIG. 5 is analogous to the operation of previously-described embodiments. The first current source 532 provides a first current to the first current electrode 522. The current flows through the conductive body of the probe 516 to the second current electrode 524 and thence via a current return line 540 to the first current source 532. Values relating to voltages across receiver electrodes 546, 550, 552 are then used in providing compensation for variations in electrode location or variations in the conductivity of the probe 516. The second current source 534 provides a second current to first current electrode 522. The second current flows through the conductive probe 516 to the terminal resistance 582. Values relating to the voltages across receiver electrodes 546, 550, 552, compensated for the variations in electrode location and probe conductivity, are provided to the measuring unit 566 and thence to the processor/recorder 574. The measurement process is repeated at a plurality of locations within the well 510 to provide a profile of relative and/or absolute formation conductivities.

In the embodiment depicted in FIG. 5, relative resistivity of the surrounding formation 520 is obtained by replacing Equation (10), above, with the following relationship:

$$\frac{\Delta V_{1e}'}{V_{546,550}} = K \, \sigma_f R_{582} (Z_{550} - Z_{546}) \tag{19}$$

where

K is a probe-dependent parameter;

$V_{546,550}$ is the voltage across first and second receiver electrodes in response to a second current flowing between first and third current electrodes 522, 526;

$\sigma_f$ is the formation conductivity;

$R_{582}$ is the resistance in ohms of the terminal resistance 582; and $Z_{550}-Z_{546}$ is the vertical distance in meters between the second and first receiver electrodes 550, 546.

The value of the parameter K is most easily determined empirically by placing the probe 516 in a medium of known conductivity, measuring the voltages across the receiver electrodes 546, 550, 552 and using Equation (19) to calculate the value of K. K can also be calculated theoretically from a knowledge of the material of composition of the probe and its length, thickness and other parameters.

By providing electrodes such as those depicted in FIG. 5 attached to an electrically conductive drilling string, with suitable brushes or other apparatus for providing electrical contact under conditions of rotation, the method of the present invention can also be used to determine conductivity of formations in a well which is undergoing active drilling.

As will be known to those skilled in the art, various modifications and combinations of the embodiments shown in FIGS. 1-5 can be used to practice methods used within the scope of the present invention. Since there are electrical parameters related to voltage, the determination of formation conductivity may be accomplished by the principles of the present invention by the use of mathematical relationships that include such related parameters. Although the probes are shown as being of a generally cylindrical shape, they may be of any shape so long as the proper spaced relationship between the various electrodes is maintained. Although various electrodes are shown in the figures to be in contact with the casing it is, in general, possible to place these electrodes in a position not in direct electrical contact with the casing. In any embodiment, the remotely positioned current electrode can be placed either in the borehole or on the surface. Although in FIG. 1 fourth current electrode 130 and reference potential electrode 180 are depicted as separate structures, it is possible to use a single electrode for both purposes, by providing a switch so that the line from the single electrode can be either connected to the current sources 132, 134, or can be connected to the measuring unit 166. Even though FIG. 2 shows four receiver electrodes disposed in the well, a greater number of electrodes may be used. When more than three receiver electrodes are present it is possible to obtain conductivities of two or more strata simultaneously. Furthermore, although FIGS. 1-5 depict the measuring unit and processor/recorder as separate units, they may be a single unit including a properly programmed computer. It is should also be appreciated that devices other than a computer can be used to calculate the conductivity after the desired measurements are taken. The magnitude of the current is used, as described above, in obtaining the absolute value of formation conductivities, so that when only ratios of conductivities are desired, the data line for providing the current magnitude to the measuring unit need not be provided.

Additional structural variations can also be provided including locating the receiver electrodes at a depth greater than the first current electrode. The receiver electrodes may also be positioned so that some receiver electrodes are above the first current electrode and some receiver electrodes are at a depth greater than the first current electrode. Also, although FIG. 1 shows the sections of the well over which voltages are measured as being contiguous and FIG. 2 shows the sections of the well over which voltages are measured as being spaced apart, the section of the well over which voltages are measured may partially overlap. It is readily understandable that certain features of the embodiments depicted in FIGS. 1-5 may be substituted, one for the other. The three receiver electrodes of FIG. 1, for example, can be held in contact with the casing in the manner depicted for the receiver electrodes of FIG. 3. The embodiment depicted in FIG. 2 can be modified to employ only three receiver electrodes as depicted in FIG. 1, i.e. the two pairs of receiver electrodes can comprise either three or four receiver electrodes.

It is found that the effect of casing cement on measurements of conductivity is essentially negligible, provided that the thickness of the cement does not exceed about 20 centimeters. Methods for oil logging can be characterized by, among other things, the depth of investigation, i.e. the lateral distance away from the borehole at which formation characteristics are being measured by the method. The present invention provides sufficient depth of investigation that the measurements of conductivity are not seriously affected by alterations in the strata, such as infiltration or leakage of fluids, which commonly occur in the vicinity of a borehole.

Based on the foregoing detailed description of the present invention, a number of advantages of the invention are easily seen. Variations which arise from deviations of electrode location from the ideal electrode location and variations which arise from casing or probe conductivity which is vertically nonuniform can be compensated for. The signal related to formation resistivity is sufficiently large that a favorable signal-to-noise ratio is achieved. Absolute values, rather than relative values, of conductivity of formation adjacent to the cased well can be obtained. Resolution of conductivity data on the order of 0.5 to 1 meter in thickness of the surrounding formation is possible by practice of the present invention. No direct measurement of current is required in order to deduce the amount of current leakage. Recognition of the character of the electrical field within the borehole and its effect on voltages developed across the receiver electrodes permits proper placement of the receiver electrodes with respect to the current electrodes. A single apparatus and method with only minor modifications can be used to obtain formation conductivity data in fully cased, partially cased, uncased, and actively drilled wells. Apparatus can be provided for conveniently measuring the parameters for practice of this invention at a variety of levels in the well, and for directly providing values of the conductivity of the surrounding formations without the necessity for manual calculations.

As will be apparent to those skilled in the art, since the calculation of the compensation factor provides some information regarding the conductivity of the casing, this information can be used to deduce the condition of the casing. In particular, it is possible by the method of the present invention, to detect areas of the casing which have been corroded or fractured thus leading to a disruption or discontinuity in the casing conductivity in that region.

Although the present invention has been described with reference to certain embodiments, it should be appreciated that further modifications can be effected within the spirit and scope of the invention, as limited only by the scope of the appended claims.

What is claimed is:

1. A method for use in determining conductivity of an underground formation adjacent to a cased well, comprising:
   using a cased well;
   providing electrode means for supplying current;
   positioning said electrode means in said cased well;
   supplying current to the cased well using said electrode means;
   obtaining a first determined magnitude relating to the conductance of the casing over a distance in said cased well;
   obtaining a second determined magnitude relating to voltages over said distance in said well; and
   using at least said first determined magnitude and said second determined magnitude to provide a value which is related to the conductivity of the underground formation adjacent to the cased well.

2. A method, as in claim 1, wherein said distance in the cased well is known and said distance is used in determining the conductivity of the underground formation.

3. A method, as claimed in claim 1, wherein said step of obtaining said second magnitude includes:
   measuring a first value of an electrical parameter related to voltage over a first section of the cased well; and measuring a second value of an electrical parameter related to voltage over a second section of the cased well.

4. A method, as claimed in claim 3, wherein:
said step of obtaining a second determined magnitude includes providing the distance of said first section substantially equal to the distance of said second section of the cased well.

5. A method, as claimed in claim 1, wherein:
said step of obtaining said second determined magnitude includes locating a plurality of receiver electrodes within the cased well.

6. A method, as claimed in claim 1, wherein said step of supplying current includes providing spaced first and second current electrodes.

7. A method, as claimed in claim 1, wherein:
said using step includes calculating the absolute value of the conductivity of the formation.

8. A method for use in determining conductivity of an underground formation adjacent to a cased well, comprising:
using a cased well;
providing electrode means for supplying current;
locating said electrode means proximate to first and second sections of said cased well wherein voltages across said first and second sections substantially represent variations in casing conductance, and wherein voltage across said first and second section as substantially independent of formation conductivity;
supplying current to the cased well using said electrode means;
obtaining a determined magnitude by measuring a first voltage defined over said first section of the cased well, by measuring a second voltage defined over said second section of the cased well, and by defining a relationship between said first voltage and said second voltage; and
using at least said determined magnitude to provide a value which is related to the conductivity of the underground formation adjacent to the cased well.

9. A method for use in determining conductivity of an underground formation adjacent to a cased well, comprising:
using a cased well;
providing at least a first electrode for supplying current;
positioning said first electrode in said cased well;
supplying current to said first current electrode within the cased well;
permitting the current supplied to said first current electrode to flow a predetermined distance of at least ten times the radius of said cased well;
obtaining a determined magnitude relating to at least two voltages each of said voltages being measured while said current is being supplied to said first current electrode and each of said voltages being relative to a distance in the cased well; and
using at least said determined magnitude to provide a value which is related to the conductivity of the underground formation adjacent to the cased well.

10. A method for use in determining conductivity of an underground formation adjacent to a cased well, comprising:
providing first and second current electrodes;
providing a source of electric current operably connected to said first and second current electrodes for causing a current to flow between said first and said second electrodes;
positioning said first and second current electrodes in a first region within said well adjacent a section of well casing;
positioning first and second pairs of receiver electrodes between said first and said second current electrodes wherein the casing between said first pair of receiver electrodes has a first conductance and wherein the casing between said second pair of receiver electrodes has a second conductance different from said first conductance;
positioning a third current electrode at least a predetermined distance from said receiver electrodes;
causing a current to flow between said first and said second current electrodes;
measuring a first value of an electrical parameter related to voltage between said first pair of receiver electrodes;
causing a current to flow between said first and said third current electrodes;
measuring a third value of an electrical parameter related to voltage between said first pair of receiver electrodes;
measuring a fourth value of an electrical parameter related to voltage between said second pair of receiver electrodes;
using said first and second values to compensate for the difference between said first conductance and said second conductance; and
using said third, fourth and fifth values to provide a value which is related to the conductivity of a first underground formation adjacent to the well.

11. A method, as claimed in claim 10, further comprising:
positioning said first and second pairs of receiver electrodes in a second region of the cased well to provide a value which is related to the conductivity of a second underground formation adjacent the cased well; and
obtaining the ratio of the conductivity of said first underground formation to the conductivity of said second underground formation.

12. A method, as claimed in claim 10, wherein said step of using said first and second values comprises:
using said first and second values to obtain the ratio of a first voltage between said first pair of receiver electrodes to a second voltage between said second pair of receiver electrodes;
using said third value to obtain a third voltage between said first pair of receiver electrodes;
using said fourth value to obtain a fourth voltage between said second pair of receiver electrodes;
calculating a compensation quantity by multiplying said ratio by said fourth voltage; and
subtracting said compensation quantity from said third voltage.

13. A method, as claimed in claim 10, wherein said step of using said first and second values comprises:
providing an electrical circuit between said first pair of receiver electrodes; and
adjusting said electrical circuit, before performing said steps of measuring said third value and measuring said fourth value, such that the voltage between said first pair of receiver electrodes, including said electrical circuit, is substantially equal to the voltage between said second pair of receiver electrodes.

14. A method, as claimed in claim 10, wherein:
said step of causing a current to flow between said first and said second current electrodes is performed simultaneously with said step of causing current to flow between said first and said third current electrodes.

15. A method, as claimed in claim 10, wherein a portion of said well is uncased, further comprising:
providing an electrical resistance element between said casing and said third current electrode.

16. A method for use in determining conductivity of an underground formation adjacent to a well, comprising:
providing a probe having a conductive body and bearing first and second pairs of receiver electrodes positioned between first and second current electrodes to define a first distance equal to the smallest of all the distances from each current electrode to each receiver electrode;
positioning said probe in said well;
positioning a third current electrode to define a second distance equal to the distance from the third electrode to the nearest point on the probe wherein said second distance is greater than said first distance;
connecting a resistance element between said probe and said third current electrode;
causing a current to flow between said first and said second current electrodes;
measuring a first value of an electrical parameter related to voltage between said first pair of receiver electrodes;
measuring a second value of an electrical parameter related to voltage between said second pair of receiver electrodes;
causing a current to flow between said first and said third current electrodes;
measuring a third value of an electrical parameter related to voltage between said first pair of receiver electrodes;
measuring a fourth value of an electrical parameter related to voltage between said second pair of receiver electrodes;
following said steps of measuring a first value and measuring a second value, using said first and second values to compensate for the difference of probe conductance between said first and second receiver electrodes from probe conductance between said second and third receiver electrodes; and
following said step of measuring a third value and measuring a fourth value, using said first, second, third and fourth values to provide a value which is related to the conductivity of an underground formation adjacent to the well.

17. An apparatus for use in obtaining conductivity of an underground formation adjacent to a well, comprising:
first, second and third current electrodes, at least one of said first, second and third electrodes being positioned in said well;
means for supplying a first current between said first current electrode and said second current electrode;
means for supplying a second current between said first current electrode and said third current electrode;
receiver electrode means for receiving said first and second currents; and
means responsive to said receiver electrode means for use in determining the conductivity of the underground formation using a first determined magnitude relating to voltage associated with said receiver electrode means responsive to said first current, and a second determined magnitude relating to voltage associated with said receiver means responsive to said second current.

18. An apparatus, as claimed in claim 17, wherein:
said first determined magnitude relates to voltage differences associated with said receiver electrode means.

19. A method for use in determining conductivity of an underground formation adjacent to a well having a casing, comprising:
measuring the value of at least a first electrical parameter in the well;
using said measured value to obtain a first determined value relating to conductivity of the formation and conductance of the casing; and
compensating said first determined value for variations in conductivity of the casing to provide a second determined value relating to conductivity of the formation.

20. The method, as claimed in claim 19, wherein:
said step of obtaining a first determined value comprises providing at least three receiver electrodes defining first and second distances; and
said step of compensating comprises compensating said first determined value for differences between said first and second distances.

21. A method, as claimed in claim 19, further comprising:
using said second determined value to obtain the absolute value of the conductivity of the formation.

22. The method, as claimed in claim 19, further comprising:
obtaining a third determined value relating to conductivity of a second formation and conductance of a second portion of the casing;
compensating said third determined value for variations in conductance of the casing to provide a fourth determined value relating to conductivity of the second formation; and
using said second determined value and said fourth determined value to obtain the ratio of the conductivity of the first formation to the conductivity of the second formation.

23. A method for use in determining conductivity of an underground formation adjacent to a well having a casing, comprising:
providing at least three receiver electrodes;
positioning said electrodes with at least one of said electrodes in the well to define first and second distances;
obtaining a first determined value relating to conductivity of the formation and conductance of the casing using said receiver electrodes; and
compensating said first determined value for differences between said first and second distances to provide a second determined value relating to conductivity of the formation.

24. The method, as claimed in claim 23 further comprising:
using said second determined value to obtain the absolute value of the conductivity of the formation.

25. The method, as claimed in claim 23 further comprising:
obtaining a third determined value relating to conductivity of a second formation and conductance of a second portion of the casing;
compensating said third determined value for variations in conductance of the casing to provide a fourth determined value relating to conductivity of the second formation, and
using said second determined value and said fourth determined value to obtain the ratio of the conductivity of the first formation to the conductivity of the second formation.

26. An apparatus for use in determining conductivity of at least a first underground formation adjacent to a well having a casing, comprising:
means for measuring at least a first electrical parameter in the well;
first means for obtaining a first determined value relating to conductivity of the formation and conductance of the casing using said means for measuring; and
second means for compensating said first determined value for variations in conductance of the casing to provide a second determined value relating to conductivity of the first formation.

27. The apparatus of claim 26 wherein:
said first means comprises at least three receiver electrodes defining first and second distances; and
said second means comprises means for compensating said first determined value for the difference between said first and second distances.

28. The apparatus, as claimed in claim 26, further comprising:
third means for obtaining the absolute value of the conductivity of the formation using said second determined value.

29. The apparatus, as claimed in claim 26, further comprising:
third means for positioning said first means to obtain a third determined value relating to conductivity of a second formation and conductance of a second portion of the casing;
fourth means for positioning said second means to provide a fourth determined value relating to conductivity of the second portion of the formation; and
means for obtaining the ratio of conductivity of said first formation to conductivity of said second formation using said second determined value and said fourth determined value.

30. An apparatus for use in determining conductivity of at least a first underground formation adjacent to a cased well, comprising:
at least three receiver electrodes, at least one of said three receiver electrodes being positioned in the well, said three receiver electrodes being positioned to define first and second distances;
first means for obtaining a first determined value relating to conductivity of the formation and conductance of the casing, using said receiver electrodes; and
second means for compensating said first determined value for the difference between said first and second distances to provide a second determined value relating to conductivity of the first formation.

31. The apparatus, as claimed in claim 30 further comprising:
third means for obtaining the absolute value of the conductivity of the formation using said second determined value.

32. The apparatus, as claimed in claim 30 further comprising:
third means for positioning said first means to obtain a third determined value relating to conductivity of a second formation and conductance of a second portion of the casing,
fourth means for positioning said second means to provide a fourth determined value relating to conductivity of the second portion of the formation; and
means for obtaining the ratio of conductivity of said first formation to conductivity of said second formation using said second determined value and said fourth determined value.

33. A method for use in determining conductivity of an underground formation adjacent to a well having a cased portion and an uncased portion, comprising:
measuring the value of at least a first electrical parameter in the well;
using said measured value to obtain a determined value relating to the conductivity of a portion of the formation adjacent the cased portion of the well;
providing means for supplying current to the cased portion of the well; and
compensating for the electrical effects of the uncased portion of the well.

34. A method, as claimed in claim 33, wherein:
said step of providing means for supplying current comprises providing a current source; and
said step of compensating comprises electrically connecting a resistance element between said casing and said current source.

35. A method, as claimed in claim 33, wherein:
said step of providing means for supplying current comprises providing at least one current electrode; and
said means for compensating comprises electrically connecting an element having resistance between said casing and said at least one current electrode.

36. Apparatus for use in determining conductivity of an underground formation adjacent to a well having a cased portion and an uncased portion, comprising:
means for measuring at least a first electrical parameter in the well;
means for obtaining a determined value relating to the conductivity of the formation using said means for measuring; and
means for compensating for the electrical effects of the uncased portion of the well.

37. An apparatus, as claimed in claim 36, wherein:
said means for supplying current comprises a current source; and
said means for compensating comprises an element having resistance electrically connected between said casing and said current source.

38. An apparatus, as claimed in claim 36, wherein:
said means for supplying current comprises at least one current electrode; and
said means for compensating comprises an element having resistance electrically connected between said casing and said at least one current electrode.

39. A method for use in determining conductivity of an underground formation adjacent to an uncased well, comprising:
provide means for supplying current to said well;
providing at least two current electrodes;
providing at least three receiver electrodes;
positioning at least one of said two current electrodes and three receiver electrodes in said well;
obtaining a determined value relating to conductivity of the formation by measuring a value related to a voltage between at least two of said receiver electrodes while said means for supplying current is used to supply current to at least one of said current electrodes; and
providing a means for simulating at least some electrical effects of a well casing.

40. A method, as claimed in claim 39, wherein:
said step of providing a means for simulating comprises providing an electrically conductive probe adjacent to said two current electrodes and said three receiver electrodes.

41. A method, as claimed in claim 39, further comprising:
electrically connecting an element having resistance between said means for simulating and said means for supplying current.

42. An apparatus for use in determining conductivity of an underground formation adjacent to an uncased well, comprising:
means for supplying current to said well;
at least two current electrodes and at least three receiver electrodes, at least one of said current electrodes and receiver electrodes being located in said well;
means for obtaining a determined value relating to conductivity of the formation, by measuring one or more electrical parameters, said measured electrical parameters including the voltage across two of said receiver electrodes wherein said measuring occurs while said means for supplying current is used to supply current to at least one of said current electrodes; and
means for simulating at least some electrical effects of a well casing.

43. An apparatus, as claimed in claim 42, wherein:
said means for simulating comprises an electrically conductive probe adjacent to said two current electrodes and said three receiver electrodes.

44. An apparatus, as claimed in claim 42, further comprising:
a resistive element electrically connected between said means for simulating and said means for supplying current.

45. A method for use in determining conductivity of an underground formation adjacent to a well having a radius, comprising:
placing spaced first, second and third receiver electrodes in said well;
placing a first current electrode in said well wherein the distances from said first current electrode to each of said first, second and third receiver electrodes are each greater than about 10 times said radius;
placing spaced second and third current electrodes in said well;
using said first, second and third current electrodes to supply current to the well;
measuring the value of at least a first electrical parameter in said well using said first, second and third receiver electrodes; and
using said measured value to provide a determined value which is related to the conductivity of the underground formation adjacent to the cased well.

46. An apparatus for use in determining conductivity of an underground formation adjacent to a well having a radius, comprising:
spaced first, second and third receiver electrodes positioned in said well;
a first current electrode positioned in said well wherein each of the distances from said first current electrode to each of said first, second and third receiver electrodes is greater than about 10 times said radius;
a second current electrode positioned in said well;
means for supplying current to said well using said first and second current electrodes;
means for measuring the value of at least a first electrical parameter in said well, using at least one of said first, second and third receiver electrodes; and
means for providing a value which is related to the conductivity of the underground formation adjacent to the cased well using a value obtained by said means for measuring.

47. A method for use in determining conductivity of an underground formation adjacent to a well having a casing, comprising:
measuring at least a first electrical parameter related to the formation conductivity wherein said first electrical parameter is affected by variations in the conductivity of the casing; and
determining the conductivity of the formation while taking into account said variations in the conductivity of the casing.

48. A method for determining the conductivity of an underground formation adjacent to a cased well, the steps of:
defining a first distance and a second distance;
measuring an electrical parameter related to the formation conductivity wherein said electrical parameter is affected by variation between said first distance and said second distance; and
determining the conductivity of the formation while taking into account any variation between said first and second distances.

49. An apparatus for use in determining conductivity of an underground formation adjacent to a well having a casing, comprising:
probe means for placement into the well;
means for measuring an electrical parameter related to the formation conductivity using said probe means wherein said electrical parameter is affected by variations in the conductivity of the casing; and
means for determining the conductivity of the formation while taking into account said variations in the conductivity of the casing.

50. An apparatus for use in determining conductivity of an underground formation adjacent to a well having a casing, comprising:
means from which a first distance and a second distance can be defined;
means for measuring an electrical parameter related to the formation conductivity wherein said electrical parameter is affected by a difference between said first and second distance; and
means for determining the conductivity of the formation while taking into account any difference between said first and second distances.

* * * * *